United States Patent [19]
Pfeffer

[11] Patent Number: 6,128,293
[45] Date of Patent: Oct. 3, 2000

[54] MULTISERVICE ACCESS MANAGEMENT SYSTEM

[75] Inventor: Robert Pfeffer, Bad Homburg, Germany

[73] Assignee: Nortel Networks Corporation, Richardson, Tex.

[21] Appl. No.: 08/767,675

[22] Filed: Dec. 17, 1996

Related U.S. Application Data

[60] Provisional application No. 60/008,917, Dec. 20, 1995.

[51] Int. Cl.[7] .................................................. H04Q 11/00
[52] U.S. Cl. .......................... 370/359; 370/353; 370/419; 370/420; 370/463
[58] Field of Search ..................................... 370/389, 395, 370/535, 465, 466, 467, 470, 471, 522, 357, 359, 360, 419, 420, 524, 264, 351, 352, 353, 356, 463, 401; 379/88.17

[56] References Cited

U.S. PATENT DOCUMENTS

| | | | |
|---|---|---|---|
| Re. 35,050 | 10/1995 | Gibbs et al. ............................... | 379/93 |
| 5,062,133 | 10/1991 | Melrose ..................................... | 379/94 |
| 5,208,848 | 5/1993 | Pula .......................................... | 379/67 |
| 5,351,276 | 9/1994 | Doll, Jr. et al. ........................... | 379/67 |
| 5,386,459 | 1/1995 | Veeneman et al. ....................... | 379/93 |
| 5,390,241 | 2/1995 | Bales et al. ............................... | 379/207 |
| 5,392,345 | 2/1995 | Otto .......................................... | 379/265 |
| 5,404,400 | 4/1995 | Hamilton ................................. | 379/386 |
| 5,459,780 | 10/1995 | Sand ........................................ | 379/265 |
| 5,463,685 | 10/1995 | Gacchter et al. ........................ | 379/207 |
| 5,682,386 | 10/1997 | Arimilli et al. .......................... | 370/468 |
| 5,689,553 | 11/1997 | Ahuja et al. ............................. | 370/352 |

Primary Examiner—Ajit Patel
Assistant Examiner—Bob A. Phunkulh
Attorney, Agent, or Firm—Foley & Lardner

[57] ABSTRACT

A system for managing access by a plurality of terminal devices to an access line of a public switched telephone network (PSTN). The system comprises a SAU (service access unit) connected to the access line, and a FSP (full service provider) which is interconnectable through a call connection within the telephone network to the SAU. The SAU includes a plurality of interfaces each adapted to communicate with a respective terminal device connected thereto. This combination of the SAU and the FSP interconnected through the PSTN enables each of the terminal devices to access or be accessed from multiple service networks. The management system effectively provides multiple independent telephony "service" over the single access line by sharing the available bandwidth of the PSTN connection between the SAU and the FSP amongst the various terminal devices as required.

32 Claims, 3 Drawing Sheets

MULTISERVICE ACCESS MANAGEMENT SYSTEM

RELATED APPLICATION

This application is related to Provisional application Ser. No. 60/008,917 filed Dec. 20, 1995 U.S. application Ser. No. 08/516,269 now U.S. Pat. No. 5,610,910, entitled "Access To Telecommunications Networks In Multiservice Environment", by Mihai Focsaneanu et al., filed on Aug. 17, 1995, which has a common assignee with the present application and the specification of which is incorporated herein by reference.

This invention was made with Government support under Grant No. P01 CA 30206, awarded by the National Institutes of Health.

BACKGROUND OF THE INVENTION

This invention relates generally to telephony based service systems and, in particular, to a management system having a client server based architecture interconnected by a telephone network whereby a plurality of terminal devices may have access to various service networks simultaneously over a single line connection to the telephone network.

Conventional wisdom of telephony service providers has been to offer subscribers new services, such as ISDN, effected through an upgrading of networking facilities and installation of additional access lines, typically fiber cable, to subscriber homes. This approach is a rather expensive endeavor and consequently is being carried out gradually.

An alternative for deriving more service from existing network facilities is taught in U.S. Pat. No. 5,062,133, issued Oct. 29, 1991 to Melrose, which relate to a call management system wherein a plurality of terminal devices may be accessed separately over a single access line. The Melrose system enables a caller to recursively access a plurality of service terminals including a computer, facsimile machine, answering machine and telephone set. In response to an incoming call, the Melrose system connects the caller to an answering machine which plays a recorded announcement that indicates the various service options available. The caller can then select any one of these options by dialing an associated code indicated by the announcement, responsive to which the system connects the caller to the corresponding service terminal. If the selected option proves unproductive for the caller, the call either automatically returns to the answering machine or the caller may dial another code in order to access its corresponding service terminal. This recursive feature enables the caller to sequentially select each service terminal to which the caller is connected, thereby achieving access to the multiple services in a single call connection.

The Melrose system is deficient in that access to the multiple service terminals can only be effected with a human caller through a manual selection process and it is only capable of sequential access to the multiple terminals. Furthermore, the Melrose system supports only telephone network based access and can not interface with other communication networks.

It is, therefore, desirable to have adjunct systems whereby more value from existing telephone network facilities may be realized.

SUMMARY OF THE INVENTION

It is an object of the present invention to provide a new and improved method and system for managing multiservice access over a single access line.

The invention, therefore, according to a first broad aspect provides A system for interfacing a plurality of terminal devices to an access line of a telephone network, comprising: a SAU (service access unit) connected to the access line, and a FSP (full service provider) which is interconnectable though a call connection within the telephone network to the SAU; wherein the SAU includes a plurality of interfaces each adapted to communicate with a respective terminal device connected thereto; a line interface through which the SAU communications over the access line and telephone network connection with the FSP; means for transmitting, via the line interface, terminal outgoing traffic which includes outgoing data received from the terminal interfaces and corresponding source terminal information; and means for receiving, via the line interface, terminal incoming traffic which is provided to the terminal interfaces in accordance with destination terminal information extracted therefrom; and wherein the FSP includes a telephone network interface which supports multiple call connections with the telephone network including the connection with the SAU; means for receiving, via the telephone network interface, the terminal outgoing traffic; means for providing, responsive to correlating the source terminal information extracted from the terminal outgoing traffic to one or more other call connections, the corresponding outgoing data to the other call connections through the telephone network interface; and means for transmitting, via the telephone network interface, the terminal incoming traffic which includes incoming data received from the other call connections and information for routing to appropriate terminals.

In accordance with a second broad aspect, the invention provides A service access unit, connectable through an access line to a telephone network and connectable to a plurality of terminal devices, for use with a full service provider to which a connection may be established through the telephone network in order to provide multiple service over the access line and network connection, comprising: a plurality of interfaces each adapted to communicate with a respective device of the terminal devices connected thereto; a line interface adapted to transmit and receive data over the access line and telephone network connection with the full service provider; means for transmitting, via the line interface, terminal outgoing traffic which includes outgoing data received from the terminal interfaces and corresponding source terminal information; and means for receiving, via the line interface, terminal incoming traffic which is provided to the terminal interfaces in accordance with destination terminal information extracted therefrom.

In accordance with a third broad aspect, the invention provides A full service provider, connectable to a telephone network, for use with a service access unit which is connected by an access line to the telephone network and to which a connection may be established through the telephone network, the service access unit having a plurality of terminal devices communicatively coupled thereto, the full service provider comprising: a telephone network interface which supports multiple call connections with the telephone network including the connection with the SAU; means for receiving, via the telephone network interface, the terminal outgoing traffic; means for providing, responsive to correlating the source terminal information extracted from the terminal outgoing traffic to one or more other call connections, the corresponding outgoing data to the other call connections through the telephone network interface; and means for transmitting, via the telephone network interface, the terminal incoming traffic which includes incoming data received from the other call connections and information for routing to appropriate terminals.

In accordance with a fourth broad aspect, the invention provides a method of interfacing one or more terminal devices and a plurality of communications service networks which includes a telephone network, to form a full services network, comprising the steps of: transmitting outgoing traffic having data from the terminal devices and corresponding service information, through a call connection within the telephone network to a FSP (full service provider) which is communicatively coupled to the plurality of communications service networks; and routing, by the FSP, the data from the outgoing traffic according to the corresponding service information, to one or more networks of the plurality of communications service networks.

Subscriber premise service access units (SAUs) and a full service provider (FSP) server, embodying the present invention, use a telephone network as local access to provide transparent, effectively full-period/pseudo-full-period connectivity from the SAUs to the FSP, whereby multiple subscribers may advantageously access the FSP. A multitude of subscriber home terminals may be connected to the SAU for routing traffic to and from the FSP through the local telco switched network. The telephone network, in effect, provides a transparent pipe with all service level activity being in the FSP. The FSP would then route traffic from each subscriber into one or more service networks to which the FSP is connected. The FSP may provide services in unconventional manners (e.g., by passing voice over data networks) or may provide conventional connections (e.g., by passing grommed, routed, multiplexed and concentrated voice back onto the telephone network).

BRIEF DESCRIPTION OF THE DRAWINGS

The invention will be better understood from the following description of a multiservice access management system together with reference to the accompanying drawings, in which.

DETAILED DESCRIPTION

Figure 1:
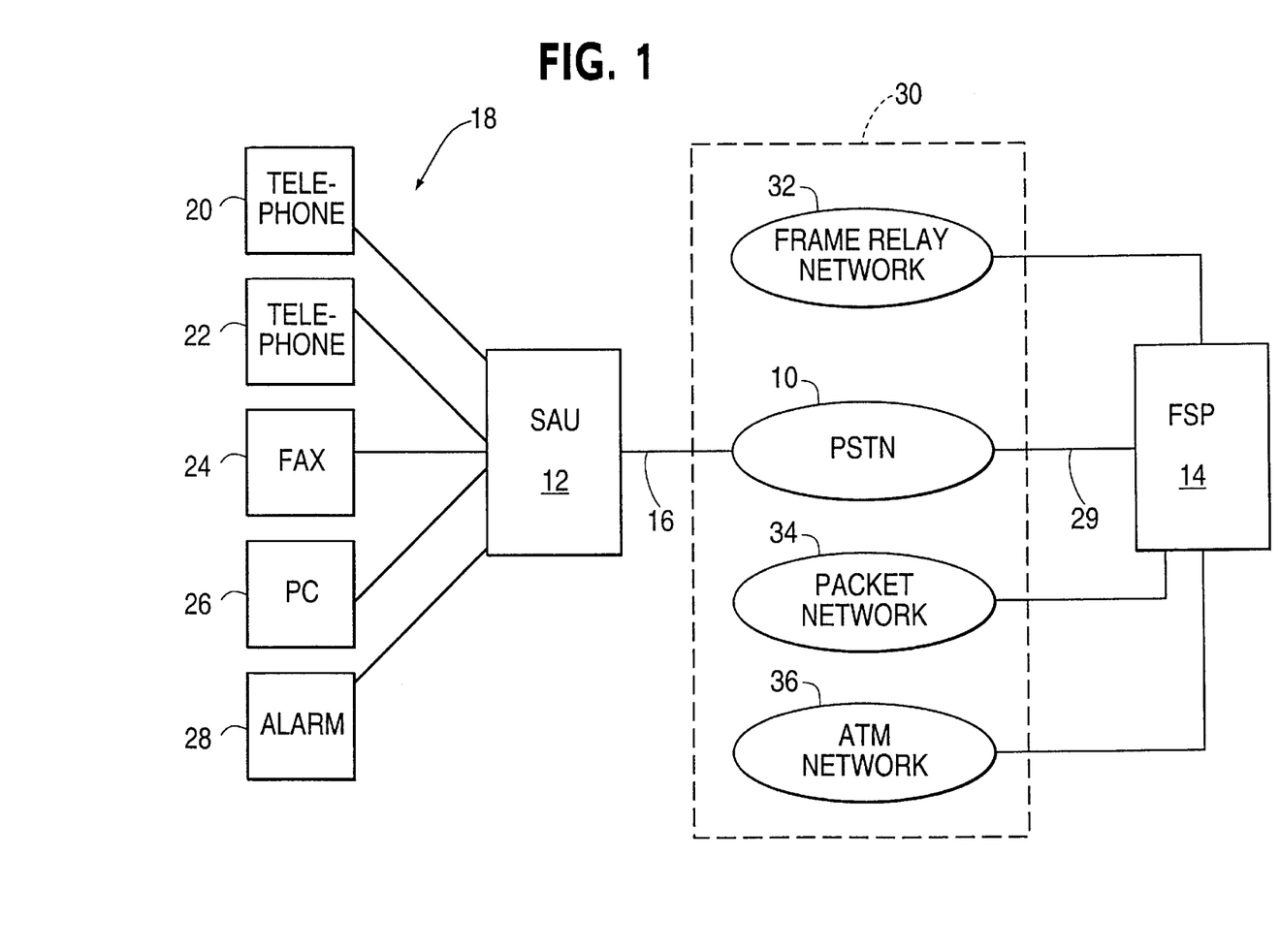
FIG. 1 is a block diagram representation of the multiservice access management system.

Referring to FIG. 1, depicted for illustration of a multiservice access management system, in accordance with the present invention, is a public switched telephone network (PSTN) 10 communicatively coupled to which are a service access unit (SAU) 12 and a full service provider (FSP) 14. The SAU 12 and the FSP 14 combination constitutes a client server arrangment, wherein the SAU 12 client is subscriber premise equipment which is connected through a single access line 16 to the PSTN 10 and to which are connected a plurality of terminal devices, generally identified by reference 18. The access line 16, for example, may be a traditional analog loop for plain old telephony service (POTS) or a digital subscriber line such as an ISDN basic rate interface (BRI) line. The terminal devices 18 are representative of conventional equipment and may include, for example, two telephone sets 20 and 22, a facsimile machine 24, a personal computer (PC) 26 and an alarm system 28. The FSP 14 server, in addition to having a connection such as a primary rate interface (PRI) link 29 to the PSTN 10, may be communicatively connected to various other types of communication service networks 30, such as, a frame relay network 32, a packet network 34 and an asynchronous transfer mode (ATM) network 36.

This combination of the SAU 12 and the FSP 14 interconnected through the PSTN 10 enables each of the terminal devices 18 to access or be accessed from any of the service networks 30. Moreover, the management system effectively provides multiple independent telephony "service" over the single access line 16 by sharing the available bandwidth provided by the PSTN connection between the SAU 12 and the FSP 14 amongst the various terminal devices 18 as required. For instance, telephone set 20 and PC 26 may be engaged in separate communications, active simultaneously, signals from each being multiplexed by the SAU 12 effectively into respective channels of bandwidth for transmission over the line 16 and connection within the PSTN 10 to the FSP 14, which de-multiplexes the transmission and may route data from each communication channel to any of the communication service networks 30. Reciprocal call signals would be multiplexed by the FSP 14 and de-multiplexed at the SAU 12 which routes the call signals to the respective terminal devices 20 and 26. The facsimile machine 24, alarm system 28 and the like may also operate on the same line 16.

It is noted that the FSP 14 may support a plurality of SAUs 12 which may simultaneously access it over the connection 29 with the PSTN 10, and that only a single SAU 12 is shown in FIG. 1 for simplicity to exemplify the multiservice access management system. It should also be understood that these particular terminal devices 18 are merely exemplary of the operation of the management system and other terminal devices or combinations thereof may be employed.

Figure 2:
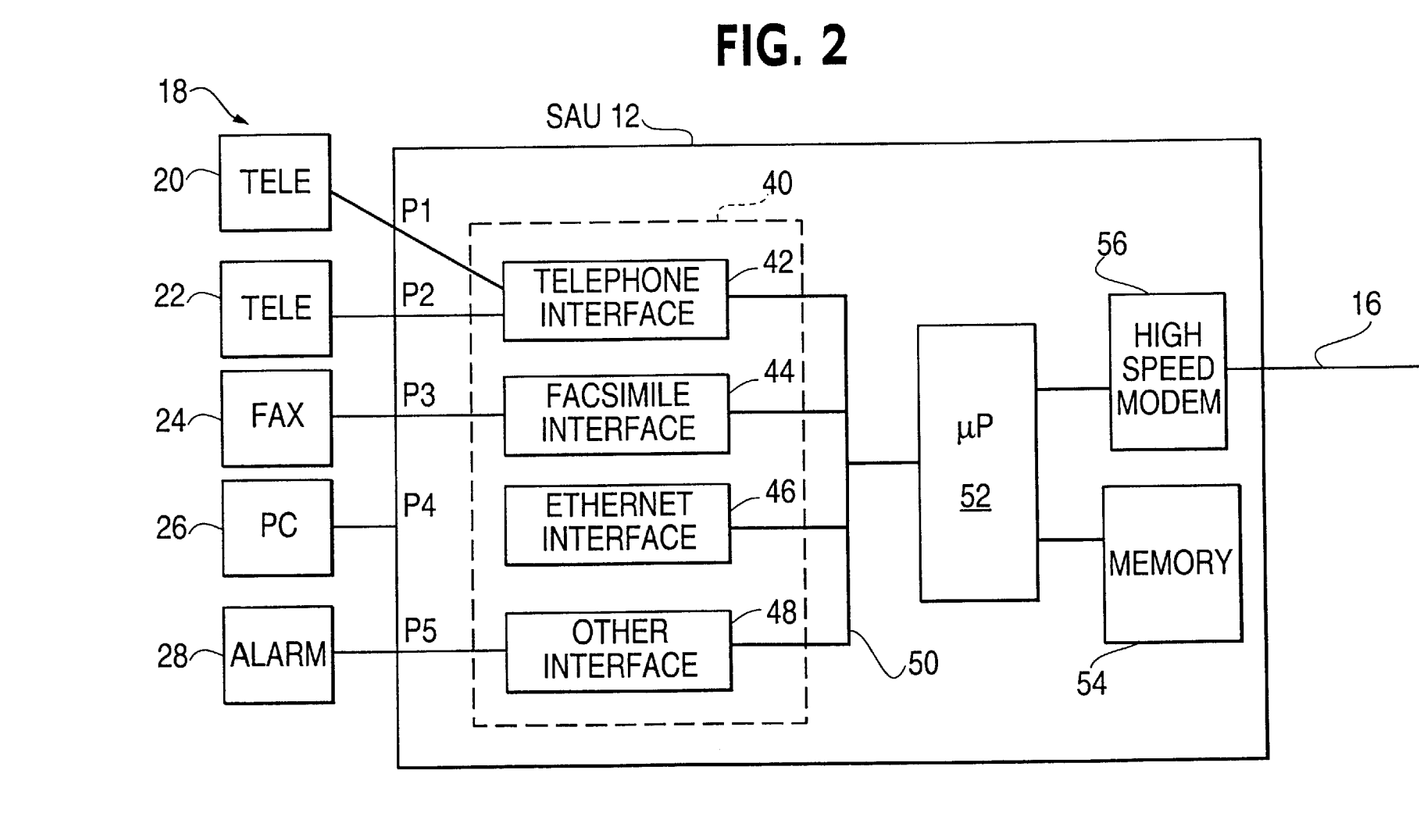
FIG. 2 is a block diagram representation of a client unit within the management system.

Turning now to FIG. 2, an embodiment of the SAU 12 is shown comprising a plurality of interface circuits, generally referred to by 40, which are adapted for communication with corresponding terminal devices 18 through respective connection ports. Each port may be associated with a unique address, represented by labels P1, P2, P3, P4 and P5. In this particular embodiment of the SAU 12, the interface circuits 40 include a telephone interface 42 attached to ports P1 and P2, a facsimile interface 44 at port P3, an ethernet interface 46 at port P4 and any other interface 48, such as a CE bus interface, at port P5 to which are connected, respectively, telephone sets 20 and 22, facsimile machine 24, PC 26 and alarm system 28. The various interface circuits 40 interact via an internal frame bus 50 with a microprocessor 52 which in turn interacts with a memory 54 and a PSTN line interface 56, such as, a high speed modem (e.g. 28.8 Kilobauds or greater) or a digital modem supporting the ISDN protocol if the line 16 to the PSTN is an analog line or ISDN BRI line, respectively.

Each interface 40 effects an adaptation function whereby conventional signals being received from the respective terminal device 18 connected thereto are adapted into frames of information in the form of digital data for transmission to the FSP 14 and, conversely, information frames received from the FSP 14 are adapted to the conventional signals of the target terminal device 18. All interface units 40 may include microcontrollers and memory buffers to enable dynamic rate adaptation, traffic smoothing and reconstitution of received information when such is transported in multiple frames (i.e., large data packets). Furthermore, the interface units 40 may be equipped with data compression capabilities in order to more efficiently utilize available bandwidth which is dependent upon the type of interface 56 and line 16 connection to the PSTN 10. An alternative to pulse code modulation (PCM) encoding of voice, requiring 64 Kbits/second (Kbps) of bandwidth, is modified adaptive differential (ADPCM) which utilizes a 24 Kbps bandwidth. Whether the PSTN interface 56 is the 28.8 Kbaud analog modem or the ISDN digital modem providing a total bandwith of 144 Kbps (i.e. two bearer channels having 64 Kbps each and a data channel of 16 KKbps), there is sufficient bandwidth to be shared by multiple concurrent data calls together with one (or more in connection with the ISDN line) voice calls.

The microprocessor 52, operating under the control of appropriate software in the memory 54, functions to multiplex any information frames received, via the internal frame bus 50, from the various interfaces 40 for transmission to the FSP 14 and to de-multiplex any multiplexed information frames received from the FSP 14. The individual de-multiplexed frames are then routed over the internal frame bus 50 to the destination interface 40 whose port is identified in the information frame. The microprocessor 52 controls the PSTN line interface 56 within the SAU 12 to effect transmission and reception of multiplexed frames over the access line 16 through the PSTN 10 to the FSP 14, and also to establish a PSTN call connection (if one does not already exist) with the FSP 14 when a terminal device 18 wishes to originate an outgoing call.

An information frame, according to a preferred structure, may be characterized by a header segment and a data segment. The header may include fields to indicate: length of the data segment which is variable; an interface port number of the client to which the frame is destined or from which it originates; and type of information contained in the data segment. Information types, for example, include voice, data, modem, signaling and initialization. The frame structure supports variable length frames which may be dynamically altered, dependent upon active traffic and available bandwidth, by the SAU 12 and the FSP 14 when multiple terminal devices 18 are concurrently engaged thereby requiring access to the single line 16. For instance, the maximum frame size may be limited if any voice information streams exist (i.e., when any of the telephone sets 20 and 22 are being utilized) to ensure a minimal delay variation for voice call service. It is noted, however, that a possible alternative is to simply utilize a fixed frame length but variable length frames are preferred for better performance. Signaling information frames are utilized to pass instructions between the SAU and the FSP, for example, to request a particular communications service (e.g. identify PSTN, ATM, frame relay, etc.). A particluar embodiment of the information frame may be an ATM cell format, for instance, which fits inside the 28.8 Kbps modem traffic and which may be adapted to include the types of information specified for the information frame. Such would create a 20 to 25 Kbps (depending on retransmission levels) payload, but in a format more compatible to data communications technological evolution.

Figure 3:
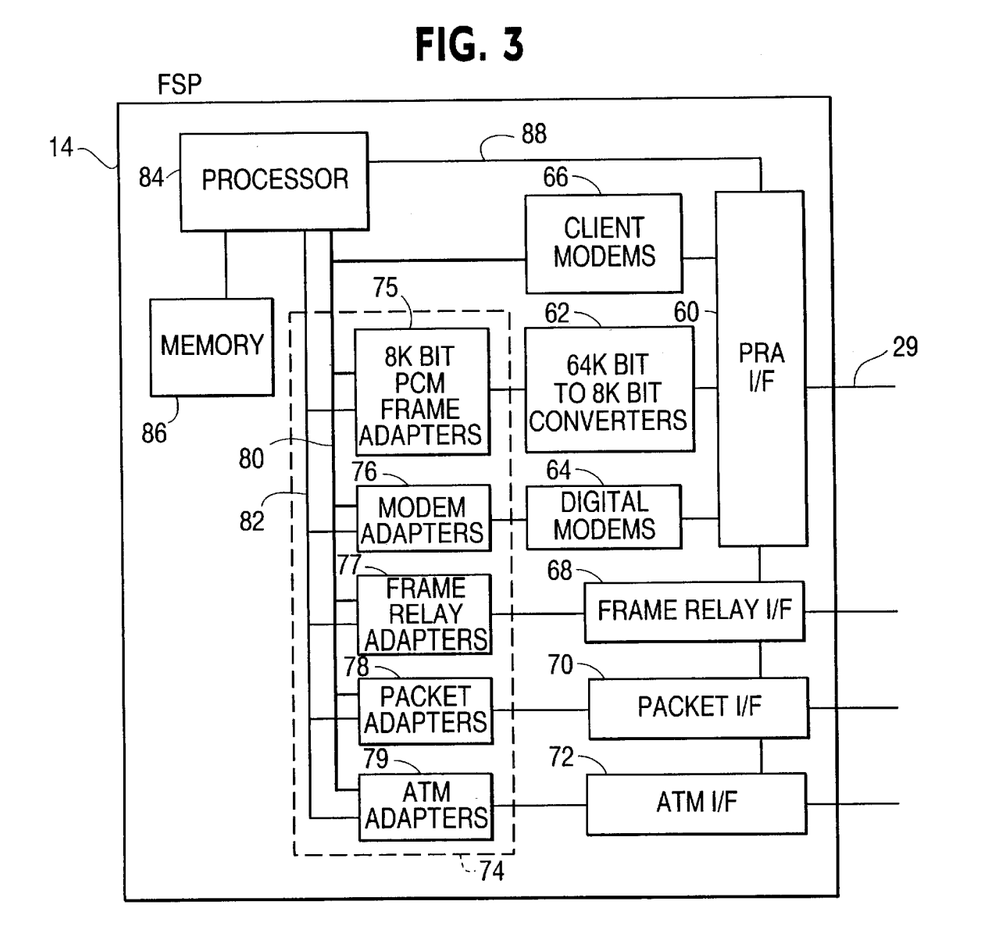
FIG. 3 is a block diagram representation of a server within the management system.

In FIG. 3, an embodiment of the FSP 14 is illustrated comprising an ISDN primary rate access (PRA) interface 60 which is coupled to a plurality of 64 Kbit-to-8 Kbit converters 62, digital modems 64 and client modems 66 and through which the FSP 14 communicates over link 29 with the PSTN 10. The PRA interface 60 supports multiple communication channels (i.e., calls) with the PSTN 10, and provides the means by which the FSP 14 may intiate and receive telephone calls. The FSP 14 may include further interfaces, such as a frame relay interfaces 68, packet interfaces 70 and ATM interfaces 72 whereby the FSP 14 is capable of communicating with corresponding service networks. In general, the interfaces within the FSP 14 may be characterized as means for effecting communication with a particular communication service network, for instance, through a physical coupling and an appropriate protocol conversion. Connected to the 64 Kbit-to-8 Kbit converters 62, digital modems 64 and various network interfaces 68, 70 and 72 are respective frame adapters 74, namely 8 Kbit PCM adapters 75, modem adapters 76, frame relay adapters 77, packet adapters 78 and ATM adapters 79. The various frame adapters 74 communicate over an internal frame bus 80 and control bus 82 with a microprocessor 84 which is coupled to a memory 86 and to the PRA interface 60 by a signaling bus 88. An example of a processing platform upon which the FSP 14 may be implemented is Nortel's Network Application Vehicle.

The FSP 14 holds in its memory 86 profile data for all clients that it servers. The profile data of each SAU 12 includes a client identifier, a directory number (DN) at which that client is accessible through the PSTN 10 and an address correlation table containing service addresses or directory information by which the SAU client is known in relation to the different service networks, thereby allowing the FSP 14 to terminate and originate communication traffic on behalf of its SAU clients. For each service address, there is identified in the correlation table a corresponding port of the SAU 12. An example of service addresses may be to have associated with a particular SAU 12 multiple DNs each corresponding to a respective terminal device 18 attached to that SAU 12, but calls dialed to those service DNs are actually routed through the PSTN 10 to the FSP 14. The service DN, received from the PSTN 10, is utilized by the FSP 14 to identify which of its SAU clients and to which terminal device 18 of that SAU 12 the incoming call is to be directed. A particular way to effect routing of service DN calls is to use a conventional "call-forward" feature supported in PSTN 10. Calls coming in through the PSTN 10 to a dialed service DN associated with a particular subscriber may be call forwarded to the FSP 14, allowing the FSP to add that incoming call to any traffic already present on that subscriber's line 16.

The processor 84, operative under control software in the memory 86, effects functionality, for terminal originating traffic, to receive multiplexed information frames from the PSTN 10 through link 29 and client modems 66, de-multiplexes the received frames and routes the individual frames via the internal frame bus 80 to the appropriate frame adapter 74 of the service network to which that information frame is destined. When terminating traffic, the processor 84 receives individual frames from the various frame adapters 74 of which frames having information intended for a particular client are then time division multiplexed for transmission by the client modems 66 through the PSTN to that SAU. The frame adapters 74 provide adaptation functionality similar to that effect by the interfaces 40 within the SAU 12. Each adapter 74 may include microcontrollers and memory buffers to enable dynamic rate adaptation, traffic smoothing and reconstitution of received information when such is transported in multiple frames, and also may be equipped with data compression capabilities in order to more efficiently utilize available bandwidth. The PRA interface 60, frame relay interface 68, packet interface 70 and ATM interface 72 provide protocol conversion functionality.

The following describes, with reference being made to FIGS. 1, 2 and 3 together, the operation of the multiservice access management system and illustrates the adaptation functionality effected by the SAU 12 and the FSP 14.

Firstly, basic system initialization consists of provisioning the FSP 14 with profile information of authorized SAU clients which includes identification numbers of SAUs 12 and correlation information containing one or more addresses for each of the communication service networks.

In the particular arrangement shown in FIG. 1, for example, the SAU 12 may have five service DNs corresponding to respective terminal devices 20, 22, 24, 26 and 28. These five service DNs would be stored in the profile record which is associated with that SAU client, together with an identifier of the SAU and an actual DN at which the FSP 14 may establish a connection through the PSTN 10 with the SAU 12. The SAU 12 is provisioned with a telephone DN of the FSP 14 and when connected to the PSTN 10, the SAU auto dials the FSP server in order to establish an on-line connection over which the SAU client and FSP server may communicate. With the network connection established, the SAU 12 may send an initialization message indicating its identification number and for each of its addressable interface ports, the interface type such as telephone, facsimile, PC, etc. and the respective address (e.g., service DNs with respect to PSTN access) in relation to the various service networks 30. This will enable the FSP 14 to use the appropriate adaptation function as required for a specific terminal device. The FSP 14 will determine if its provisioned information matches that received and subsequently responds with an initialization status message whereby the SAU 12 may provide a visual status indication to the user.

With respect to POTS operation, the telephone interface 42 of the SAU 12 of FIG. 2, may include a POTS line card function having a low bit rate codec, a modem signal generator to implement class signaling, dual tone multi-frequency (DTMF) detection, on/off hook detection and ringing signal generation. Information frames having a signaling header are utilized for signaling, ringing and dialing control. For example, when either of the telephone sets 20 and 22 goes off hook, such is detected by the telephone interface 42 which in response generates an information frame having in its header the type field indicating signaling and the port address indicating either P1 or P2, and in the data segment an instruction that the server is to originate a call. That information frame is transmitted under the control of the microprocessor 52 within the SAU 12 using the high speed modem 56, through the PSTN 10 to the FSP 14. Upon realizing that the received information frame is a signaling frame for originating a call, the processor 84 of the FSP 14 generates the appropriate signals through its PRA link 29 to the PSTN 10 in order to be assigned a channel and receive dial tone. Thereafter, the processor 84 records in the address correlation table of the profile data being maintained for the SAU 12 an identifier of the assigned channel together with the port, either P1 or P2, utilizing that channel and then connects a 64 Kbit-to-8 Kbit PCM converter 62 to the assigned 64 Kbit primary rate channel. The 8 Kbit bit stream representing dial tone received from the converter 62 is packetized into frames having a voice header and the appropriate port address at the PCM adapter 75, from which the information frames are transferred over the internal frame bus 80 to the client modems 66 for transmission to the SAU 12. The processor 52 of the SAU 12 routes the received voice frame to the telephone interface 42 which depacketizes the 8 Kbit bit stream and passes the stream through the codec to generate a voice frequency signal which in this case gives dial tone. When the telephone user dials, the interface 42 detects the DTMF digits and sends the corresponding digit values in signaling frames to the FSP 14 which generates the appropriate digit messages to the PSTN 10. Once the call is connected, information frames having a voice data type and PCM voice data are transmitted between the SAU 12 and the FSP 14.

For facsimile machines, the interface 44 at the SAU 12 and the digital modems 64 together with the modem adapters 76 at the FSP 14 provide the capability to terminate facsimile modem tones and translate them into their digital representation to be carried between each of the SAU 12 and the FSP 14. The server's digital modems 64 are in a pool whereby they may be shared among all authorized SAU clients of the FSP 14. Incoming facsimile calls from the PSTN 10 interface to the facsimile identified DN of the particular SAU 12 and are connected to an available modem within the pool of digital modems 64. The facsimile interface 44 on the SAU 12 may also have other POTS signaling functions to remain compatible with analog facsimile machines. Calls originated by the SAU 12 operate in reverse, with a signaling message sent to the FSP 14, similar to the operation discussed above in connection with telephony voice call service. This technique also allows facsimile transmissions between two cooperating FSP servers to be alternatively routed through another communication network, such as the frame relay network 32, instead of the PSTN 10.

Now having regard to data communications in relation to personal computers, carrying data to and from the PC 26 coupled to the SAU 12 may be effected similar to the operation indicated above for facsimile machines and, alternatively, via a frame based interface such as an Ethernet protocol. The data frames according to the ethernet protocol are adapted into information frames of the client server protocol, having a type indication of data in the frame header, at the ethernet interface 46 which are carried between the SAU 12 and the FSP 14. The FSP 14 performs the appropriate adaptation function, at any of the frame relay adapters 77 and frame relay interface 68, the packet adapters 78 and packet interface 70 and the ATM adapters 79 and corresponding interface 72 in order to communicate with any of the frame, packet and ATM service networks, respectively.

It should be understood that the multiservice access management system could readily be adapted for use with additional types of terminal devices, such as the alarm system, and for providing other telemetry services by equipping the SAU 12 with an appropriate interface. Other interfaces 48, such as for the alarm system 20 and are also possible.

Those skilled in the art will recognize that various modifications and changes could be made to the invention without departing from the spirit and scope thereof. It should therefore be understood that the claims are not to be considered as being limited to the precise embodiments of the multiservice access management system set forth above, in the absence of specific limitations directed to each embodiment.

I claim:

1. A system for interfacing a plurality of terminal devices to an access line of a telephone network, comprising:

a SAU (service access unit) connected to the access line, and a FSP (full service provider) which is interconnectable through a call connection within the telephone network to the SAU;

wherein the SAU includes a plurality of interfaces each adapted to communicate with a respective terminal device connected thereto; a line interface through which the SAU communicates over the access line and telephone network connection with the FSP; means for transmitting, via the line interface, terminal outgoing traffic which includes outgoing data received from the terminal interfaces and corresponding source terminal information, and means for receiving, via the line interface, terminal incoming traffic which is provided to the terminal interfaces in accordance with destination terminal information extracted therefrom;

wherein the FSP includes a telephone network interface which supports multiple call connections with the telephone network including the connection with the SAU; means for receiving, via the telephone network interface, the terminal outgoing traffic; means for providing, responsive to correlating the source terminal information extracted from the terminal outgoing traffic to one or more other call connections, the corresponding outgoing data to the other call connections through the telephone network interface, and means for transmitting, via the telephone network interface, the terminal incoming traffic which includes incoming data received from the other call connections and information for routing to appropriate terminals; and wherein the terminal interfaces of the SAU include means for adapting signals from the respective terminal devices into information frames having the terminal outgoing data and the corresponding source terminal information, and means for adapting the incoming data from received information frames into signals for the respective terminal devices, the adaptation being effected at a particular interface for incoming data only when the routing information in the received frames corresponds to that particular interface.

2. A system as claimed in claim 1, wherein the access line is an analog line and the line interface is a analog modem.

3. A system as claimed in claim 1, wherein the access line is an ISDN line and the line interface is a digital modem.

4. A system for interfacing a plurality of terminal devices to an access line of a telephone network, comprising:

a SAU (service access unit) connected to the access line, and a FSP (full service provider) which is interconnectable through a call connection within the telephone network to the SAU;

wherein the SAU includes a plurality of interfaces each adapted to communicate with a respective terminal device connected thereto; a line interface through which the SAU communicates over the access line and telephone network connection with the FSP: means for transmitting, via the line interface, terminal outgoing traffic which includes outgoing data received from the terminal interfaces and corresponding source terminal information; and means for receiving, via the line interface, terminal incoming traffic which is provided to the terminal interfaces in accordance with destination terminal information extracted therefrom;

wherein the FSP includes a telephone network interface which supports multiple call connections with the telephone network including the connection with the SAU; means for receiving, via the telephone network interface, the terminal outgoing traffic; means for providing, responsive to correlating the source terminal information extracted from the terminal outgoing traffic to one or more other call connections, the corresponding outgoing data to the other call connections through the telephone network interface; and means for transmitting, via the telephone network interface, the terminal incoming traffic which includes incoming data received from the other call connections and information for routing to appropriate terminals;

wherein the FSP includes further interfaces adapted to interact with corresponding communication service networks: and means for providing the terminal outgoing data to and receiving terminal incoming data from any of the telephone network interface and the further interfaces;

wherein the further interfaces include any of a frame relay interface, a packet interface, and an asynchronous transfer mode interface; and wherein the terminal interfaces of the SAU include means for adapting signals from the respective terminal devices into information frames having the terminal outgoing data and the corresponding source terminal information, and means for adapting the incoming data from received information frames into signals for the respective terminal devices, the adaptation being effected at a particular interface for incoming data only when the routing information in the received frames corresponds to that particular interface.

5. A system as claimed in claim 4, wherein the FSP includes adaptation means for adapting signals from the telephone network interface and the further interfaces into the information frames having the terminal incoming data for transmission to the SAU and for adapting the information frames having the terminal outgoing data from the SAU into signals for the respective interfaces.

6. A system as claimed in claim 5, wherein, in the SAU, the means for transmitting the terminal outgoing traffic includes means for multiplexing individual information frames having outgoing data received from the interfaces, and means for transmitting the multiplexed frames via the line interface to the FSP; and the means for receiving the terminal incoming traffic of the SAU includes means for de-multiplexing multiplexed information frames received from the FSP, and means for providing the individual de-multiplexed frames having the terminal incoming data to the interfaces; and wherein, in the FSP, the means for transmitting the terminal incoming traffic includes means for multiplexing individual information frames having the incoming data received from the adaptation means, and means for transmitting the multiplexed frames via the telephone network interface to the SAU; and the means for receiving the terminal outgoing traffic includes means for de-multiplexing multiplexed information frames received from the SAU, and means for providing the individual de-multiplexed frames having the terminal outgoing data to the adaptation means.

7. A system as claimed in claim 6, wherein the information frames include an indication corresponding to the terminal device from which it originates or to which it is destined.

8. A system as claimed in claim 7, wherein the information frames include an indication of information type.

9. A system as claimed in claim 8, wherein the indication of information type includes any of voice, data, modem, signaling, initialization.

10. A system as claimed in claim 9, wherein the information frames may varying in length and include an indication of length.

11. A system as claimed in claim 10, wherein the SAU and the FSP comprise means for limiting the length of information frames when voice information traffic exists.

12. A system as claimed in claim 6, wherein the interfaces of the SAU and the adaptation means of the FSP further comprise memory buffer means for dynamic rate adaptation, traffic smoothing and reconstitution of information frames.

13. A system as claimed in claim 12, wherein the interfaces of the SAU and the adaptation means of the FSP further comprise data compression means.

14. A service access unit connectable through an access line to a telephone network and connectable to a plurality of terminal devices, for use with a full service provider to which a connection may be established through the telephone network in order to provide multiple service over the access line and network connection, comprising:

a plurality of interfaces each adapted to communicate with a respective device of the terminal devices connected thereto;

a line interface adapted to transmit and receive data over the access line and telephone network connection with the full service provider;

means for transmitting, via the line interface, terminal outgoing traffic which includes outgoing data received from the terminal interfaces and corresponding source terminal information; and means for receiving, via the line interface, terminal incoming traffic which is provided to the terminal interfaces in accordance with destination terminal information extracted therefrom, wherein the interfaces include means for adapting signals from the respective terminal devices into information frames having the terminal outgoing data for transmission to the full service provider, and means for adapting received information frames having the terminal incoming data into signals for the respective terminal devices, wherein the means for transmitting the terminal outgoing traffic includes means for multiplexing individual information frames having the outgoing data received from the interfaces, and means for transmitting the multiplexed frames via the line interface to the full service provider, and wherein the means for receiving the terminal incoming traffic includes means for de-multiplexing multiplexed information frames received from the full service provider, and means for providing the individual de-multiplexed frames having the terminal incoming data to the interfaces.

15. A service access unit as claimed in claim 14, wherein the information frames include an indication corresponding to the terminal device from which it originates or to which it is destined.

16. A service access unit as claimed in claim 15, wherein the information frames include an indication of information type.

17. A service access unit as claimed in claim 16, wherein the indication of information type includes any of voice, data, modem, signaling, initialization.

18. A service access unit as claimed in claim 17, wherein the information frames may varying in length and include an indication of length.

19. A service access unit as claimed in claim 18, comprise means for limiting the length of information frames when voice information traffic exists.

20. A service access unit as claimed in claim 14, wherein the interfaces further comprise memory buffer means for dynamic rate adaptation, traffic smoothing and reconstitution of information frames.

21. A service access unit as claimed in claim 20, wherein the interfaces further comprise data compression means.

22. A service access unit as claimed in claim 14, wherein the access line is an analog line and the line interface is a analog modem.

23. A service access unit as claimed in claim 14, wherein the access line is an ISDN line and the line interface is a digital modem.

24. A full service provider, connectable to a telephone network, for use with a service access unit (SAU) which is connected by an access line to the telephone network and to which a connection may be established through the telephone network, the SAU having a plurality of terminal devices communicatively coupled thereto, the full service provider comprising:

a telephone network interface which supports multiple call connections with the telephone network including the connection with the SAU;

means for receiving, via the telephone network interface, the terminal outgoing traffic;

means for providing, responsive to correlating the source terminal information extracted from the terminal outgoing traffic to one or more other call connections, the corresponding outgoing data to the other call connections through the telephone network interface;

means for transmitting, via the telephone network interface, the terminal incoming traffic which includes incoming data received from the other call connections and information for routing to appropriate terminals;

further interfaces adapted to interact with corresponding communication service networks, and means for providing the terminal outgoing data to and receiving the terminal incoming data from any of the telephone network interface and the further interfaces, wherein the further interfaces include any of a frame relay interface, a packet interface, and an asynchronous transfer mode interface; and adaptation means for adapting signals from the telephone network interface and the further interfaces into the information frames having the terminal incoming data for transmission to the SAU and for adapting the information frames having the terminal outgoing data from the SAU into signals for the respective interfaces;

wherein the means for transmitting the terminal incoming data includes means for multiplexing individual information frames having the incoming data received from the adaptation means, and means for transmitting the multiplexed frames via the telephone network interface to the SAU; and the means for receiving the terminal outgoing data includes means for de-multiplexing multiplexed information frames received from the SAU, and means for providing the individual de-multiplexed frames having the terminal outgoing data to the adaptation means.

25. A full service provider as claimed in claim 24, wherein the information frames include an indication corresponding to the terminal device from which it originates or to which it is destined.

26. A full service provider as claimed in claim 24, wherein the adaptation means further comprise memory buffer means for dynamic rate adaptation, traffic smoothing and reconstitution of information frames.

27. A full service provider as claimed in claim 26, wherein the adaptation means further comprise data compression means.

28. A method of interfacing one or more terminal devices and a plurality of communications service networks which includes a telephone network, to form a full services network, comprising:

transmitting outgoing traffic having data from the terminal devices and corresponding service information, through a call connection within the telephone network to a FSP (full service provider) which is communicatively coupled to the plurality of communications service networks;

routing, by the FSP, the data from the outgoing traffic according to the corresponding service information, to one or more networks of the plurality of communications service networks;

transmitting incoming traffic having data received from any of the plurality of communications service networks and corresponding terminal information, from the FSP, through the call connection within the telephone network to a SAU (service access unit) which is communicatively coupled to the one or more terminal devices, wherein the SAU is communicatively coupled to the FSP through a single access line, and data received from any of the plurality of communications service networks is multiplexed for transmission on the single access line; and routing, by the SAU, the data from the incoming traffic according to the terminal information, to corresponding ones of the one or more terminal devices.

29. A method as claimed in claim 28, wherein the service information in the outgoing traffic includes an indication of the terminal device from which the corresponding data originates, and routing by the FSP according to the service information includes correlating the terminal device to a particular communications service network.

30. A method as claimed in claim 29, wherein correlating the terminal device to the particular communications service network includes maintaining, by the FSP, profile data in relation to the SAU, the profile data including a correlation table having address or directory information by which the terminal devices of the SAU are identifiable in the plurality of communications service networks.

31. A method as claimed in claim 30, wherein the plurality of communications service networks includes any of a frame relay network, a packet network and an asynchronous transfer mode network.

32. A full service provider, connectable to a telephone network, for use with a service access unit (SAU) which is connected by an access line to the telephone network and to which a connection may be established through the telephone network, the SAU having a plurality of terminal devices communicatively coupled thereto, the full service provider comprising:

a telephone network interface which supports multiple call connections with the telephone network including the connection with the SAU;

a receiver to receive, via the telephone network interface, the terminal outgoing traffic in multiplexed frames from the SAU;

a processor to de-multiplex the multiplexed information frames received from the SAU, and to multiplex individual information frames having terminal incoming data which includes incoming data received from the other call connections and information for routing to appropriate terminals; and a transmitter to transmit, via the telephone network interface, the multiplexed terminal incoming data to the SAU.

* * * * *